United States Patent Office 2,786,831
Patented Mar. 26, 1957

2,786,831

PROCESS OF RECOVERING BASIC ANTIBIOTICS

Charles R. Bartels, Westfield, Gerald Kleiman, Elizabeth, and Donald B. Irish and John N. Korzun, Highland Park, N. J., assignors to Olin Mathieson Chemical Corporation, New York, N. Y., a corporation of Virginia No Drawing. Application June 1, 1954,
Serial No. 433,836

18 Claims. (Cl. 260—210)

This invention relates to the recovery and/or purification of nitrogen basic antibiotics (hereinafter referred to for brevity as "basic antibiotics"), and more specifically is concerned with the separation of a basic antibiotic produced by a fermentation process from the whole broth in which it has been formed.

Although the invention will be described with particular reference to the recovery of streptomycin, it is equally operative in the recovery of other basic antibiotics, such as neomycin, streptothricin, or other antibiotically active basic compounds, which (like streptomycin) are capable of being adsorbed on a particulate cation exchanger. By the term "whole broth" is meant a fermentation broth which has not been subjected to a treatment for the separation of any component thereof, either solid or liquid. In other words, the whole broth is the fermentation broth directly as received from the fermenter, hence containing mycelium, spores, unused nutrients, and the antibiotic, as well as any other components originally present in the medium or formed in the fermentation thereof. By the term "particulate cation exchanger" is meant a material in relatively small particle form which has the ability to adsorb and/or exchange cations.

When streptomycins are produced by fermentation, there is obtained, as the resulting whole broth, an aqueous mixture comprising unreacted nutrient media, mycelium, spores, a streptomycin (e. g. streptomycin and/or mannosidostreptomycin), and various impurities. Prior to this invention, the separation of a streptomycin from whole broth involved a series of steps including: (1) acidifying the whole broth so as to permit filtration; (2) filtering the acidified mixture, usually with the addition of a filter aid, to remove the culture solids, namely, mycelium, spores, and other solid impurities; (3) neutralizing the filtrate (i. e. culture liquid) so as to prepare it for adsorption on a cation exchange material; (4) removing the streptomycin from the neutralized filtrate by adsorption on a cation exchange material; (5) eluting the streptomycin from the cation exchange material by means of an acid; and (6) recovering the streptomycin from the eluate.

We have now found that, by the practice of this invention, the first three steps of the prior process may be eliminated. This invention not only results in a simplification of the process, in that there is no need for the acidification, filtration, and neutralization steps; but it also has the advantage of increasing the final yield of streptomycin, since loss of streptomycin due to said acidification, filtration, and neutralization steps is eliminated. Another advantage of the invention is the elimination of the necessity of a filter aid, which is a costly additive, usually not recoverable.

An object of this invention, therefore, is to simplify the method of recovering streptomycin or other basic antibiotics from whole broths containing same.

Another object of this invention is to directly remove streptomycin or other basic antibiotics from whole broths containing them.

Still another object of this invention is to directly remove streptomycin or other basic antibiotics from whole broths containing them by means of particulate cation exchangers.

These objects are accomplished by the process of this invention which in its essence comprises contacting a whole broth containing streptomycin or other basic antibiotics with a particulate cation exchanger (preferably a weak acid cation exchanger, especially one which is a resin and derives its exchange capacity essentially from carboxylic groups) in its salt form (e. g., sodium cycle), separating the antibiotic-stripped whole broth from the particles of exchanger, and eluting the streptomycin or other basic antibiotics adsorbed by the exchanger.

The mycelium and other culture solids, as well as the culture liquid impurities, are not absorbed by the exchanger, and are separated from the exchanger as spent whole broth. The basic antibiotic is then eluted from the exchanger with an acid, preferably a dilute solution of a strong acid, such as nitric, sulfuric, or hydrochloric acid, and the antibiotic salt thus formed is recovered from the eluate in the usual manner, as for example by the process described in the U. S. patent application of Bartels, Berk, and Bryan, Serial No. 342,722, filed March 16, 1953, and now Patent No. 2,765,302, granted October 2, 1956. Since the whole broth as received from the fermenter is at a suitable pH for cation exchange, no adjustment of pH is necessary, as was required in the prior processes. However, the culture may be acidified and then neutralized before contacting with the cation exchanger. This modification aids in the recovery of streptomycin (for example) from the solids in the whole broth, but is not a necessary or preferred mode of operation.

Suitable cation exchangers for use in the process of this invention include those cation exchangers, especially cation exchange resins (and preferably of the carboxylic type) priorly used for the adsorption of streptomycin and other basic antibiotics. Examples of such resins are those described in the following U. S. patents: 2,319,359; 2,333,754; 2,340,110; and 2,340,111. These resins are sold under various trademark designations, inter alia, as: Alkalex; Amberlite IRC–50; Duolite CS 100; Permutit 216; Permutit H–70; and Wofatit C. Especially preferred is the resin sold under the trademark Amberlite IRC–50.

The process of this invention can be carried out either batchwise or continuously, using one or more cation exchange columns, tanks or other vessels. Cation exchange columns are preferred, however, because of their ease of operation and compactness.

The process in its simplest form comprises passing the whole broth containing the basic antibiotic through the particulate cation exchanger, and eluting the antibiotic adsorbed thereon. The solid and liquid impurities in the whole broth pass unadsorbed through the exchanger, and are removed therefrom by the flow of the feed. The exchanger is then washed, and the antibiotic eluted therefrom by means of an acid. The exchanger is then regenerated preparatory to the introduction of fresh feed.

Since the whole broth has a viscosity greater than the filtered broth previously used, as it passes through the particulate cation exchanger, it will tend to carry particles of the exchanger with it. It is therefore desirable to equip the column or vessel containing the exchanger with some means to separate these exchanger particles from the whole broth effluent which has been stripped of antibiotics. This separation may be done by various means, such as by centrifuging and filtering. However, the preferred method of separating exchanger particles from the stripped whole broth involves the use of a screen (hereinafter referred to as "column screen")

fine enough to retain the particles of the exchanger but coarse enough to permit free flow therethrough of the solid components in the stripped broth. This screen, although referred to as the column screen, may be positioned internally in the column between the exchanger bed and the outlet in the column, or externally of the column anywhere along the flow path of the stripped broth after it leaves the exchanger bed and the column. The optimum size for the openings in the screen are determined by the size of the solid components of the whole broth and the particle size of the exchanger. If a commercial cation exchange resin of usual particle size is used as the particulate cation exchanger, and the whole broth and resin are prescreened in the manner indicated below, a column screen of about 50–80 mesh is particularly useful, a screen of about 60 mesh being preferred.

Although it is not entirely necessary for a successful process, it is desirable to subject the whole broth, prior to its introduction into the cation exchange column, to a prescreening whereby large solid particles in the whole broth are removed. This step removes particles too large to pass through the column screen. A screen having a fineness of at least 80 mesh (preferably 100 to 200 mesh, and especially about 100 mesh) is used for this treatment, the solids trapped thereby being separately removed. The screen may be vibrated, as by rocking or agitating, to assist in this initial separation.

The particulate resin exchanger also may be prescreened before being placed in the column, so that all particles of size smaller than the column screen openings are removed. For a column screen of 50–80 mesh, an about 40 mesh screen may be used for prescreening the exchanger. This is done to prevent plugging of the screen by fines but is not essential, since the screen, if it were to become clogged, may be freed of particles in situ by agitation (as more fully described below), vibration, backwashing with water or acid, or other means well known in the art.

In order to more fully prevent the exchanger particles from being forced by the flow of the feed against the column screen, thereby clogging it, an agitator (preferably of the turbine type) may be placed in the cation exchange column so as to drive exchanger particles impinging thereon away from the screen. In an upflow process, the shaft connecting the blades of the agitator with a power source for rotating the same can be passed through a bushing in the column screen at the top of the cation exchange column, the blades being positioned between the column screen and the exchanger bed, preferably within a few inches below the screen. In a downflow process, the shaft can be passed through the top of the column so that the blades are positioned between the bottom of the exchanger bed and the screen at the bottom of the column, preferably within an inch of the screen. Other means may be substituted for the agitator to serve the same function. For example, the column screen may be equipped with a vibrator so as to shake loose any exchange particles imbedded therein; or a jet of liquid, such as water, may be caused to play on the screen to dislodge any particles adhering thereto. The screen may also be backwashed with an acid, such as dilute nitric acid, which reduces the particle size of the exchanger due to elution of the streptomycin therefrom, thus freeing the embedded particles from the screen.

The process may be carried out with one or more columns. If a plurality of columns are used, they are connected in series so that the effluent from the first column becomes the feed of the second in the usual setup. Each column is then processed until it is saturated with the antibiotic, e. g., streptomycin. The column is then bypassed, washed with water (preferably deionized water), eluted with an acid, such as nitric acid, hydrochloric acid, sulfuric acid, or other acids well known in the art to desorb the streptomycin from the cation exchanger as the salt of the eluting acid. The column is then regenerated with known regenerating bases or salts, such as caustic, ammonia, potassium hydroxide, etc. The regenerated column may then be reinserted into the series of columns as the last member thereof thus permitting a continuous process.

The whole broth may enter the column either upflow or downflow, the screen and agitator (if used) being positioned near the top or bottom of the column, respectively. The process is operative with either type of flow, but an upflow method is preferred, since under such operating conditions gravity tends to prevent the exchanger fines from clogging the screen. If the process is conducted downflow, an agitator or screen vibrator or other means should be incorporated in the column for best results, to remove and prevent particles from plugging the screen.

Although the use of ion exchange columns, as described above, is preferred, the process may be carried out using tanks or other vessels instead of columns. One such process involves a countercurrent type extraction wherein both the exchanger and feed move through the system in opposite directions. Although the process is preferably carried out using three or more tanks to insure complete recovery of the antibiotic from the whole broth, for simplicity, the process will be described using two tanks. The process involves introducing fresh particulate cation exchanger and partially spent whole broth, which has been previously contacted with partially spent exchanger, into one tank (preferably equipped with an agitator); screening the exchanger-whole broth mixture through a vibrating screen; feeding the screened exchanger to a second tank (also preferably equipped with an agitator) where it is contacted with fresh broth; screening the exchanger-whole broth mixture from said second tank through a second vibrating screen; passing the broth separated by said second screen to said first tank; and eluting the exchanger separated by the second screen to recover the streptomycin (or other basic antibiotic) adsorbed thereon. The stripped exchanger is then regenerated and introduced into the first tank. The broth from said first tank which has been stripped of streptomycin is discarded. A plurality of tanks (three, four, or more) may be used in the same manner to insure complete recovery of the streptomycin content of the whole broth. The screen used in this and other processes involving external screens is similar to the column screen used in conjunction with the cation exchange columns, both as to mesh and size.

The tanks may also be used as vessels in a concurrent batch or continuous process in the following manner. A feed of fresh whole broth and fresh resin (or other particulate cation exchanger) is introduced into a first tank equipped with an agitator. The mixed whole broth and resin is then separated by means of a vibrating screen into a partially spent whole broth filtrate and a partially spent resin residue. The resin is reintroduced into the first tank, wherein it is contacted with a second feed of fresh whole broth. The partially spent whole broth from the first feed is introduced into a second tank of fresh resin and mixed therewith. The resin and whole broth in the second tank are separated by means of a second vibrating screen. The resin is reintroduced into the second tank, and the nearly spent whole broth is introduced into a third tank containing fresh resin. The process is continued until the whole broth leaving the last tank of the series is totally stripped of antibiotics and until the resin in the first tank is totally loaded. The resin in the first tank is then eluted with acid, the antibiotic salt recovered, and the resin regenerated. The process may be rendered continuous by introducing the tank containing the newly regenerated resin as the last member of the series.

Since the viscosity of the broth effects its carrying power, viscous broths desirably should be diluted with water prior to introduction into the cation exchangers. The optimum range of viscosity for the feed is less than 60 centipoises. Ordinary streptomycin broths generally fall within this range, but more viscous broths should be diluted with an amount of water necessary to reduce the viscosity to less than 60 centipoises.

The following examples illustrate various aspects of the instant invention:

Example 1

This example illustrates a multi-column upflow process:

A whole broth containing streptomycin, obtained, for example, as described in U. S. Patent No. 2,516,682, issued July 25, 1950, is prescreened by passing it through a 100-mesh screen, thereby removing large solid particles such as unreacted nutrient media. The whole broth is then fed upflow through a series of three vertical ion exchange columns, 12 inches in diameter and 8 feet high, containing a 30-inch bed of IRC–50 resin in its salt (i. e. sodium) form, the resin having been previously classified to obtain a particle size larger than 40 mesh. The columns are topped with 60 mesh screens and equipped with turbine-type agitators positioned approximately 1 inch below the screen. The broth is fed into the bottom of the first column at the rate of 6.4 gals./ft.$^2$ of column cross-sectioned area, the spent broth exiting from the top of the first column into the bottom of the second column. When the first column has become saturated with streptomycin, the feed broth is led directly into the second column. The first column is then washed upflow with water until the washings are clear, and eluted with dilute nitric acid to obtain an eluate containing streptomycin nitrate. The stripped column is then regenerated with caustic and reintroduced into the series of columns as the last member thereof.

If the resin packs on the screens during the adsorption, the screens may be cleaned by shutting off the feed and allowing the agitator to sweep the resin clear of the screen. If the screen becomes plugged with resin fines, these may be removed by backwashing with water (by pumping water downflow through the screen).

The yields and resin capacity for the whole broth process of this invention as contrasted with the prior "filtrate" process are:

|  | Activity of whole broth treated, u./gm. resin (average) | Loss during initial filtration, u./gm. resin (average) | Activity of feed to resin column, u./gm. resin (average) | Column loading, u./gm. resin (average) | Percentage Recovery from column feed to column eluate | Percentage Recovery whole broth to column eluate (percent overall yield) |
|---|---|---|---|---|---|---|
| Whole broth process | 320,000 |  | 320,000 | 279,000 | 84.7 | 84.7 |
| Filtrate process | 320,000 | 45,000 | 275,000 | 233,000 | 84.7 | 72.9 |

Example 2

This example illustrates a single column upflow process:

A whole broth containing streptomycin and the IRC–50 resin are prescreened as described in Example 1. A 4-inch column, 17 feet high, is filled with said resin to a depth of 45 inches. The column is equipped with a screen and agitator as in Example 1. The agitator is operated at 600 R. P. M. The whole broth has a viscosity range of 20–60 centipoises. The broth is fed into the bottom of the column until the column is saturated with streptomycin. The column is then washed, eluted, and regenerated as in Example 1.

Example 3

The process of Example 2 is repeated, using a streptomycin whole broth of viscosity at harvest of approximately 200 centipoises. Before introduction into the column, the broth is diluted with a ⅓ to ½ volume of water, to attain a viscosity in the range of 20–60 centipoises. The conditions are otherwise the same as in Example 2.

Example 4

This example illustrates a single column upflow process without agitation:

(a) The process of Example 2 is repeated, except that the depth of the bed is reduced to 30 inches and the viscosity of the feed is decreased to 10 centipoises by diluting the broth with an equal volume of water. No agitator is used. The process operates to produce streptomycin free from broth impurities.

(b) The process of Example 2 is repeated, except the depth of the bed is reduced to 25 inches and the viscosity of the feed is decreased to 10 centipoises by diluting the broth with an equal volume of water. Neither an agitator nor a screen is used in the column. A 60-mesh vibrating screen is placed in the flow path of the stripped broth-resin mixture leaving the column, to separate the resin from the broth. The process operates to produce streptomycin free from broth impurities.

Example 5

This example illustrates a downflow process:

A 12-inch diameter column, 4 feet high, containing a 12-inch resin bed of IRC–50 supported on a 60-mesh screen is used. The column is equipped with a propeller agitator of 8-inch diameter set one inch above the screen. The agitator is operated at 450 R. P. M. The feed is a high viscosity-containing streptomycin whole broth. A vibrator is mounted ½ inch below the screen to keep the screen from clogging during operation. The whole broth is fed into the top of the column and the stripped whole broth removed at the bottom of the column. In other respects, the operation is the same as Example 2.

The following examples illustrate tank processes:

Example 6

Four-stage countercurrent flow process:

Four tanks equipped with agitators are used in this example. Each tank is equipped with two inlets at the top and an outlet at the bottom of the tank. A streptomycin-containing whole broth, which has been prescreened through a 100-mesh screen, and fresh IRC–50 resin in its sodium cycle, which has been screened to remove particles larger than 40 mesh, are fed into the first tank. After 278,000 units of streptomycin per gram of resin has been introduced into the tank, the mixture is agitated for two hours, removed through the outlet, and passed to a vibrating 60-mesh screen whereon the partially spent whole broth and partially spent resin containing 154,000 units/gram are separated. The resin is returned to the first tank and the partially spent whole broth is introduced into a second tank containing fresh resin, with which it is agitated for two hours. The resin and partially spent whole broth are separated as before, and the resin containing 103,000 units/gm. is returned to the second tank. The almost-spent whole broth is then introduced into a third tank containing fresh resin and the step repeated, whereby the resin in this third tank adsorbs an additional 6,400 units/gm. of resin. The step is then repeated again in a fourth tank, whereby an additional 5,000 units/mg. of resin is adsorbed. The spent whole broth, separated from the resin of the fourth tank, is then discarded. In the meantime, a second feed of whole broth containing 270,000 units of streptomycin/gram of resin has been added to the partially spent resin in the first tank, and after two hours of agitating the mixture, the partially spent whole broth and partially spent resin are separated by means of the first vibrating screen. The resin is returned to the first tank, and the partially spent whole broth is fed into the second tank. The partially spent resin in the first tank is found to have extracted 125,000 units of streptomycin/gm. of resin from this second feed. The process is continued until the resin in the first tank is loaded with streptomycin. The resin is then eluted with dilute nitric acid, the streptomycin nitrate in the eluate is recovered, and the resin regenerated with sodium hydroxide.

The above process may be rendered continuous by introducing the first tank containing the regenerated resin as the fifth tank in the series.

Example 7

Four-stage countercurrent flow process:

The apparatus and resin are the same as that of Example 6. Into the fourth tank, containing almost completely spent (thrice contacted) IRC-50 resin, is introduced fresh streptomycin-containing whole broth, which has been prescreened through a 100-mesh screen, and contains 260,000 units of streptomycin per gram of resin. The resin and broth are mixed with agitation for one hour and the broth-resin mixture is then separated on a vibrating screen. The resin, which is now loaded to 216,000 units/gm., is eluted with nitric acid and regenerated. The partially spent broth is introduced into the third tank containing twice-contacted resin and mixed therewith for one hour, after which time the resin and broth are separated and the resin is fed into the fourth tank and the broth into the second tank. The process is repeated in the second tank, the separated resin being introduced into the third tank and the whole broth into the first tank. In the first tank, the whole broth separated from the second tank and almost entirely stripped of streptomycin is contacted with fresh resin. After one hour of mixing, the resin and stripped whole broth are separated, the resin introduced to the second tank, and the stripped whole broth containing 30,000 units/gm. of resin is discarded.

By practicing the process of this example, resin which is almost completely loaded with streptomycin is contacted with fresh whole broth, whereas almost completely stripped whole broth is contacted with fresh resin. This arrangement aids in the complete separation of the streptomycin from the whole broth.

The process of Example 7 may also be carried out by substituting ion exchange columns for the tanks.

While the invention has been described in detail, it is to be understood that many changes may be made therein without departing from the spirit of the same.

We claim:

1. The process of recovering a fermentation-produced basic antibiotic, wherein a substantial amount of the antibiotic is in the culture liquid, which comprises contacting a whole broth containing the antibiotic with a particulate cation exchanger, separating the antibiotic-stripped whole broth from the particles of exchanger, and eluting the antibiotic adsorbed by the latter.

2. The process of claim 1 wherein the cation exchanger is a cation exchange resin deriving its exchange capacity essentially from carboxylic groups.

3. The process of claim 1 wherein the basic antibiotic is streptomycin.

4. The process of claim 3 wherein the whole broth-resin particle mixture is screened to retain the resin particles.

5. The process of claim 4 wherein the whole broth is screened before contact with the cation exchange resin to remove solid particles sufficiently large to be retained by the resin-broth separating screen.

6. The process of claim 4 wherein the resin is prescreened to remove resin particles sufficiently small to pass through the resin-broth separating screen.

7. The process of recovering streptomycin from the whole broth in which it has been formed, which comprises contacting said whole broth with a particular cation exchanger in a suitable column, whereby said streptomycin is adsorbed on said exchanger, whereas the whole broth stripped of streptomycin passes through said column, screening said stripped broth through a screen having openings of sufficient size to permit passage of the entire contents of said stripped broth but not particles of said exchanger and eluting the streptomycin from the exchanger.

8. The process of claim 7 wherein the cation exchanger is a cation exchange resin deriving its exchange capacity essentially from carboxylic groups.

9. The process of claim 7 wherein said screen is positioned within said column.

10. The process of claim 7, wherein said screen is positioned externally of said column.

11. The process of recovering streptomycin from the whole broth in which it has been formed, which comprises screening said whole broth to remove large particles therefrom, passing said screened whole broth through at least one of a series of columns containing a particulate cation exchanger, whereby said streptomycin is adsorbed on said exchanger, whereas the whole broth stripped of steptomycin passes through the column, screening said stripped broth through a second screen having openings of sufficient size to permit passage of the entire stripped broth but not particles of said exchanger and eluting said streptomycin from the exchanger.

12. The process of claim 11 wherein the cation exchanger is a cation exchange resin deriving its exchange capacity essentially from carboxylic groups.

13. The process of claim 12 wherein the whole broth is passed upflow through a single column.

14. The process of claim 12 wherein the whole broth is passed upflow through a series of columns, and each column is saturated before elution.

15. The process of recovering a streptomycin from the whole broth in which it has been formed, which comprises screening said whole broth through a first screen to remove large particles, passing said screened broth through at least one column containing a cation exchange resin of particle size larger than any remaining particles in said whole broth whereby said streptomycin is adsorbed on said resin, agitating the whole broth in said column, passing the whole broth through a second screen having openings of size larger than those of said first screen but smaller than the resin particles, whereby the entire stripped broth is permitted to pass therethrough but the resin is retained in the column and eluting streptomycin from the resin.

16. The process of claim 15 wherein the whole broth is passed downflow through a single column.

17. The process of claim 15 wherein the broth is passed upflow through the column.

18. A countercurrent extraction process of removing a basic antibiotic from a whole broth in which it has been formed, which comprises passing said whole broth into a first vessel containing partially-spent particulate cation exchanger; separating the broth from the exchanger; passing the separated broth into a second vessel containing fresh particulate cation exchanger; separating the broth from the second exchanger; passing the separated second exchanger into said first vessel; eluting the first exchanger separated from said first vessel to recover the basic antibiotic regenerating said first exchanger; and introducing it into the second vessel.

References Cited in the file of this patent

UNITED STATES PATENTS

| | | |
|---|---|---|
| 2,528,022 | Van Dolah et al. | Oct. 31, 1950 |
| 2,528,188 | Taylor | Oct. 31, 1950 |
| 2,541,420 | Howe et al. | Feb. 13, 1951 |